United States Patent
Kobayashi et al.

(10) Patent No.: US 8,019,372 B2
(45) Date of Patent: Sep. 13, 2011

(54) CONTROLLER APPARATUS, MOBILE TERMINAL, AND COMMUNICATION CONTROL METHOD

(75) Inventors: Motonari Kobayashi, Yokohama (JP); Toshihiro Suzuki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1012 days.

(21) Appl. No.: 11/312,490

(22) Filed: Dec. 21, 2005

(65) Prior Publication Data

US 2006/0160555 A1 Jul. 20, 2006

(30) Foreign Application Priority Data

Dec. 21, 2004 (JP) ................................ P2004-370218

(51) Int. Cl.
*H04B 7/00* (2006.01)
(52) U.S. Cl. .... 455/519; 455/453; 455/41.2; 455/456.1; 455/522
(58) Field of Classification Search ............... 455/426.2, 455/445, 557, 550.1, 41.2, 518–520, 522; 370/254, 401, 457, 338, 229, 392, 396
See application file for complete search history.

(56) References Cited

U.S. PATENT DOCUMENTS

| 3,731,271 | A  | * | 5/1973 | Muramatu et al. ............ 340/913 |
| 7,848,255 | B2 | * | 12/2010 | Suzuki et al. ................ 370/254 |
| 2003/0235174 | A1 | * | 12/2003 | Pichna et al. ................. 370/338 |
| 2004/0127214 | A1 |   | 7/2004 | Reddy et al. |
| 2006/0140135 | A1 | * | 6/2006 | Bonta et al. ................... 370/254 |
| 2006/0146731 | A1 | * | 7/2006 | Lewis et al. ................... 370/254 |
| 2006/0268792 | A1 | * | 11/2006 | Belcea ........................... 370/338 |
| 2007/0217332 | A1 | * | 9/2007 | Nakahara ...................... 370/229 |
| 2008/0227392 | A1 | * | 9/2008 | Van De Meulenhof et al. ........................... 455/41.2 |

FOREIGN PATENT DOCUMENTS

JP 11-234284 8/1999
JP 2001-44932 2/2001

OTHER PUBLICATIONS

Mung Chiang, et al., "Jointly Optimal Congestion Control and Power Control in Wireless Multihop Networks", GLOBECOM 2003, vol. 7 of 7, XP-010677829, Dec. 1, 2003, pp. 195-199.

Yongqiang Xiong, et al., Power Assignment for Throughput Enhancement (PATE): A Distributed Topology Control Algorithm to Improve Throughput in Mobile Ad-hoc Networks, Vehicular Technology Conference, XP-010702664, Oct. 6, 2003, pp. 3015-3019.

Shingo Umeshima, et al., "Power Control Based Adhoc Routing Protocol", Ad hoc Routing Protocol(s) Applying Elimination of Competition Exerted by Power Control, Report of Technical Research from the Institute of Electronics Information, and Communication Engineers (IEICE), NS2003-181, vol. 103, No. 443, Nov. 14, 2003, pp. 57-60.

* cited by examiner

*Primary Examiner* — Sujatha Sharma
(74) *Attorney, Agent, or Firm* — Oblon, Spivak, McClelland, Maier & Neustadt, L.L.P.

(57) ABSTRACT

A controller apparatus is configured to control an ad hoc network formed by a plurality of mobile terminals. The controller apparatus includes a transmission power determining unit configured to determine transmission power of a certain mobile terminal joining in the ad hoc network, based on traffic distribution in the ad hoc network.

11 Claims, 8 Drawing Sheets

| MOBILE TERMINAL ID | LOCATION INFORMATION | TERMINAL CAPABILITY INFORMATION |
|---|---|---|
| MT#11 | (X11,Y11) | A11 |
| ⋮ | ⋮ | ⋮ |

FIG. 3B

| COMMUNICATION ID | APPLICATION ID | SOURCE | DESTINATION | REQUIRED TRANSMISSION RATE | ALLOWABLE DELAY TIME |
|---|---|---|---|---|---|
| Com1 | AP1 | MT#11 | MT#24 | 64Kbps | 10ms |
| ⋮ | ⋮ | ⋮ | ⋮ | ⋮ | ⋮ |

FIG. 3C

| COMMUNICATION ID | TRANSMISSION POWER | TRAFFIC VOLUME | TRANSMISSION TIME |
|---|---|---|---|
| Com1 | Power 1 | Traffic 1 | Time 1 |
| ⋮ | ⋮ | ⋮ | ⋮ |

CONTROLLER APPARATUS, MOBILE TERMINAL, AND COMMUNICATION CONTROL METHOD

CROSS REFERENCE TO RELATED APPLICATION

This application is based upon and claims the benefit of priority from the prior Japanese Patent Application No. P2009-370218, filed on Dec. 21, 2004; the entire contents of which are incorporated herein by reference.

BACKGROUND OF THE INVENTION

1. Field of the Invention

The present invention relates to a communication control method for controlling an ad hoc network formed by a plurality of mobile terminals, and a controller apparatus and a mobile terminal used in the communication control method.

2. Description of the Related Art

An ad hoc network formed by the configuration of a number of mobile terminals connected to each other without access points therebetween, using a wireless technology such as IEEE 802.11x or Bluetooth (registered trademark), has been known. Communication between mobile terminals forming such an ad hoc network is performed through a plurality of relay mobile terminals, or multi-hop.

In the ad hoc network, a reduction in the transmission power of a source mobile terminal reduces interference with communication of other mobile terminals, thus improving overall throughput in the ad hoc network, while it increases the number of radio links through which the communication between the mobile terminals is routed (hop count), thus increasing delay time in the communication between the mobile terminals.

On the other hand, an increase in the transmission power of the source mobile terminal reduces the number of radio links through which the communication between the mobile terminals is routed (hop count), thus reducing delay time in the communication between the mobile terminals, while it increases interference with communication of other mobile terminals, thus lowering overall throughput in the ad hoc network.

Accordingly, in the ad hoc network, overall throughput in the ad hoc network and delay time in communication between mobile terminals are in a trade-off relationship.

A conventional ad hoc network, however, has the problem that it cannot perform communication control, taking a trade-off relationship between overall throughput in the ad hoc network and delay time in communication between mobile terminals into account, though traffic distribution in the ad hoc network constantly changes, depending on the location distribution of mobile terminals, traffic conditions (such as a traffic volume) at each mobile terminal, and so on.

BRIEF SUMMARY OF THE INVENTION

The present invention has been made in view of the above problem, and has an object of providing a communication control method, a controller apparatus and a mobile terminal which allow communication control according to constantly-changing traffic distribution, taking a trade-off relationship between overall throughput in an ad hoc network and delay time in communication between mobile terminals into account.

A first aspect of the present invention is summarized as a controller apparatus configured to control an ad hoc network formed by a plurality of mobile terminals, the controller apparatus including: a transmission power determining unit configured to determine transmission power of a certain mobile terminal joining in the ad hoc network, based on traffic distribution in the ad hoc network.

In the first aspect of the present invention, the controller apparatus can further include: a location information acquiring unit configured to acquire location information on the mobile terminals; and a network management information storage unit configured to manage the acquired location information on the mobile terminals as the traffic distribution.

In the first aspect of the present invention, the controller apparatus can further include: a traffic condition acquiring unit configured to acquire traffic conditions at the Mobile terminals; and a network management information storage unit configured to manage the acquired traffic conditions at the mobile terminals as the traffic distribution.

In the first aspect of the present invention, the controller apparatus can further include: a terminal capability information acquiring unit configured to acquire terminal capability information showing capabilities of the mobile terminals; and the transmission power determining unit can be configured to determine the transmission power of the certain mobile terminal, based on the traffic distribution and the terminal capability information.

In the first aspect of the present invention, the controller apparatus can further include: a communication condition information acquiring unit configured to acquire information on communication conditions required at the mobile terminals; and the transmission power determining unit can be configured to determine the transmission power of the certain mobile terminal, based on the traffic distribution and the communication condition information.

In the first aspect of the present invention, the communication condition information can be configured to include an allowable delay time and a required transmission rate set by an application operated on the mobile terminals.

In the first aspect of the present invention, the transmission power determining unit can be configured to determine the transmission power of the certain mobile terminal for each communication destination.

In the first aspect of the present invention, the controller apparatus can further include: a communication environment information acquiring unit configured to acquire communication environment information showing a communication environment at the mobile terminals; and; a proxy control information transmitting unit configured to transmit proxy control information for controlling the ad hoc network in place of the controller apparatus, to a representative mobile terminal belonging to the ad hoc network, when the acquired communication environment information satisfies a predetermined condition.

A second aspect of the present invention is summarized as a mobile terminal configured to be able to join in an ad hoc network, including: a transmitting unit configured to transmit location information on the mobile terminal and traffic conditions at the mobile terminal to a controller apparatus configured to control the ad hoc network; and a communicating unit configured to perform communication in the ad hoc network with transmission power determined by the controller apparatus based on the location information and the traffic conditions.

A third aspect of the present invention is summarized as a communication control method for controlling an ad hoc network formed by a plurality of mobile terminals, the method including: transmitting, at the mobile terminals, location information on the mobile terminals and traffic conditions at the mobile terminals to a controller apparatus configured to control the ad hoc network; determining, at the controller apparatus, transmission power of a certain mobile terminal joining in the ad hoc network, based on the received location information and traffic conditions; and performing, at the certain mobile terminal, communication in the ad hoc network with the determined transmission power.

DETAILED DESCRIPTION OF THE INVENTION (Configuration of Mobile Communication System in First Embodiment of the Invention)

With reference to FIGS. 1 to 5, the configuration of a mobile communication system according to a first embodiment of the present invention will be described.

Figure 1:
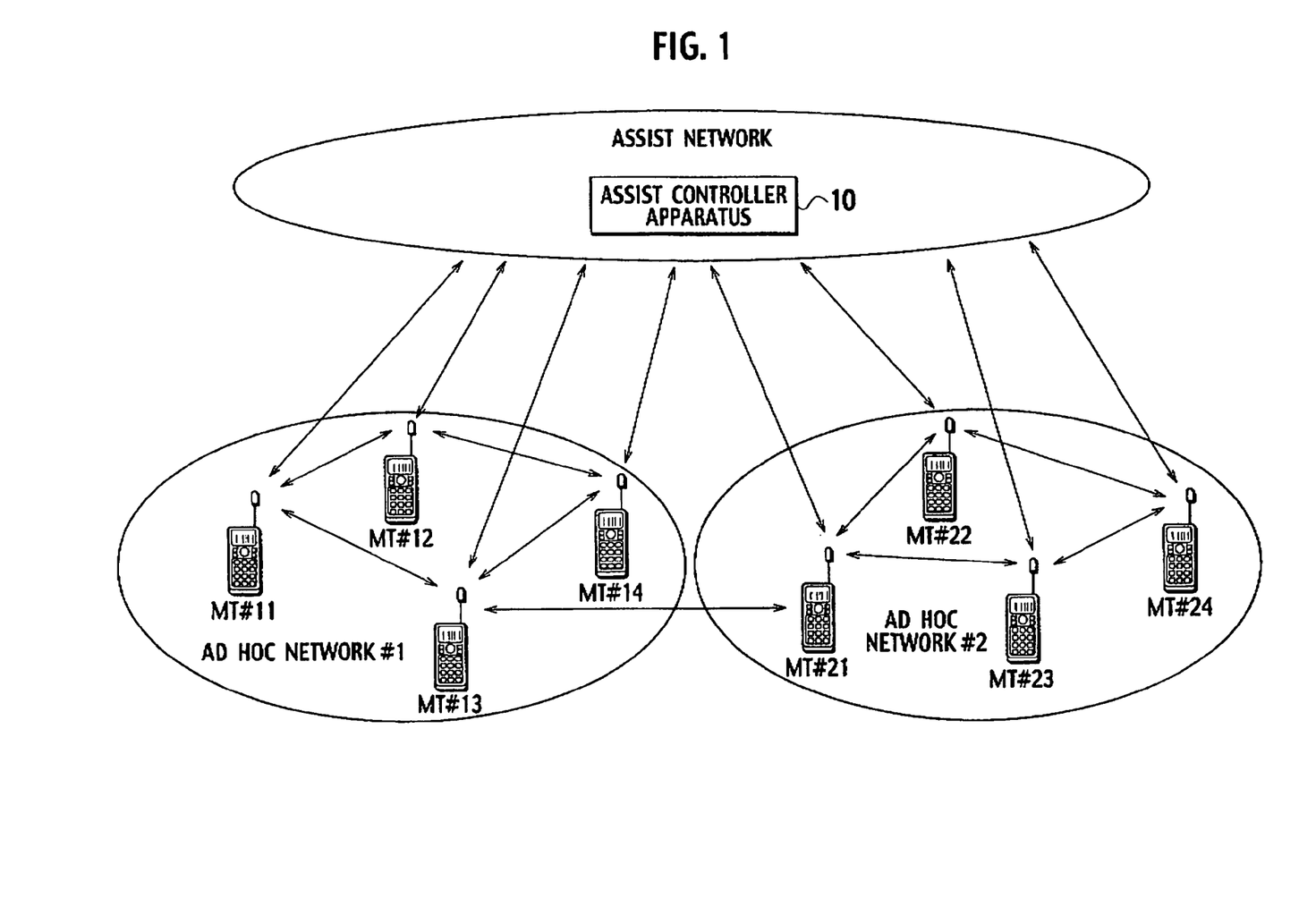
FIG. 1 is an overall configuration diagram of a mobile communication system according to first and second embodiments of the present invention.

As shown in FIG. 1, the mobile communication system of this embodiment includes an assist controller apparatus 10 and a plurality of mobile terminals MT#11 to MT#24.

The assist controller apparatus 10 is provided in an assist network constituted by a public mobile communication network, for example.

The mobile terminals MT#11 to #24 are configured to form ad hoc networks #1 and #2 by directly communicating with each other without using a public mobile communication network.

In the example of FIG. 1, the mobile terminals MT#11 to #14 form the ad hoc network #1, and the mobile terminals MT#21 to #24 form the ad hoc network #2.

The assist controller apparatus 10 of this embodiment is configured to control the ad hoc networks #1 and #2 formed by the mobile terminals MT#11 to #24.

For example, the assist controller apparatus 10 is configured to control the transmission power of a mobile terminal MT belonging to an ad hoc network.

Figure 2:
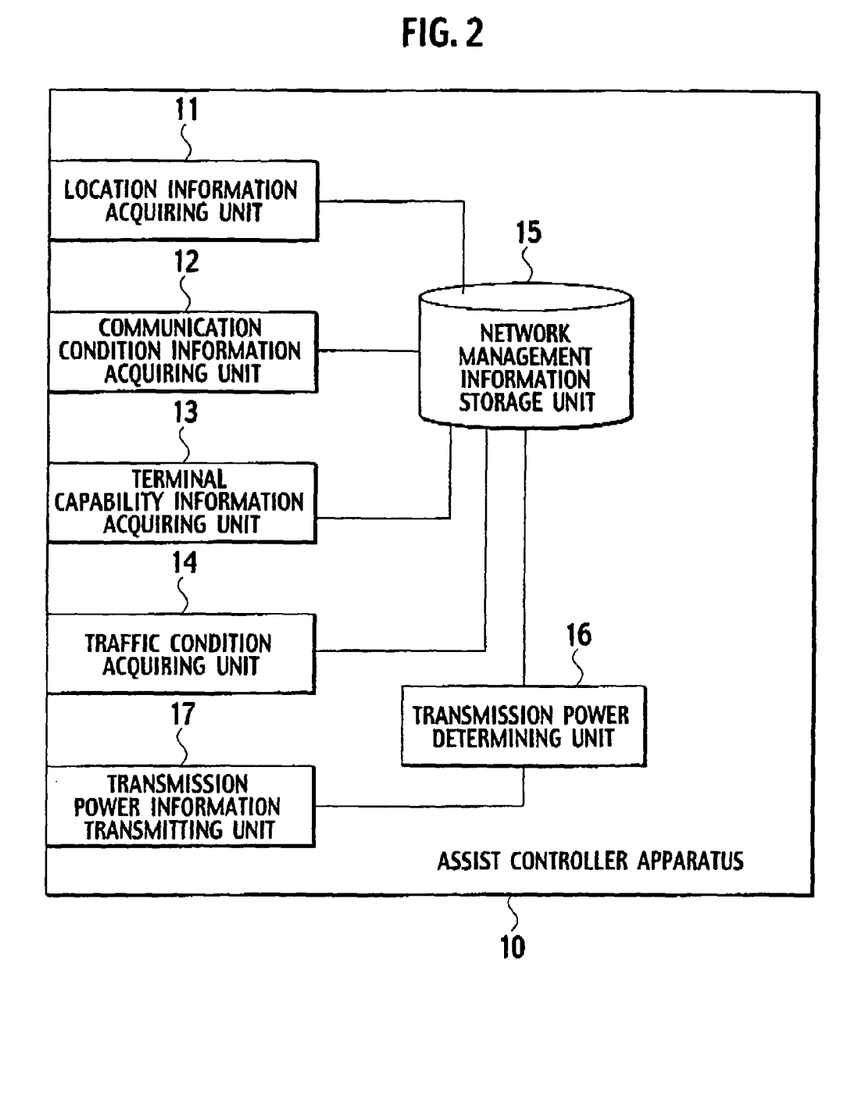
FIG. 2 is a functional block diagram of an assist controller apparatus in the mobile communication system according to the first embodiment of the present invention.

Specifically, as shown in FIG. 2, the assist controller apparatus 10 of this embodiment includes a location information acquiring unit 11, a communication condition information acquiring unit 12, a terminal capability information acquiring unit 13, a traffic condition acquiring unit 14, a network management information storage unit 15, a transmission power determining unit 16, and a transmission power information transmitting unit 17.

The location information acquiring unit 11 is configured to acquire location information on the mobile terminals MT#11 to #24.

The location information acquiring unit 11 may be configured to transmit a location information acquisition request to the mobile terminals MT#11 to #24 at predetermined timings, so as to acquire location information on the mobile terminals MT#11 to #24, for example.

The location information acquiring unit 11 may be configured to acquire location information on the mobile terminals MT#11 to #24 transmitted from the mobile terminals MT#11 to #24 at predetermined timings, for example.

The location information can include, for example, location information provided by GPS (GPS information), location information registered with an access point (access point information), or location information registered with a radio base station (base station information).

The communication condition information acquiring unit 12 is configured to acquire information about communication conditions required at the mobile terminals MT#11 to #24.

The communication condition information acquiring unit 12 is configured to acquire the communication condition information from a communication start request, a communication condition change request or the like transmitted from the mobile terminals MT#11 to #24, for example.

The communication condition information includes information such as an application ID operated on the mobile terminals MT#11 to #24 (or an allowable delay time and a required transmission rate set by the application), and a source mobile terminal and a destination mobile terminal.

The terminal capability information acquiring unit 13 is configured to acquire terminal capability information showing the capabilities of the mobile terminals MT#11 to #24.

For example, when the mobile terminals MT#11 to #24 join in the ad hoc networks #1 and #2, the terminal capability information acquiring unit 13 is configured to acquire terminal capability information showing the capabilities of the mobile terminals MT#11 to #24.

The terminal capability information includes information such as maximum allowable transmission power, a remaining battery level and a communication mode which can be handled at the mobile terminals MT#11 to #24. The terminal capability information may show a terminal capability class classified by such information.

The traffic condition acquiring unit 14 is configured to acquire traffic conditions at the mobile terminals MT#11 to #24.

For example, the traffic condition acquiring unit 14 may be configured to transmit a traffic condition acquisition request to the mobile terminals MT#11 to #24 at predetermined timings, so as to acquire traffic conditions at the mobile terminals MT#11 to #24.

The traffic condition acquiring unit 14 may be configured to acquire traffic conditions at the mobile terminals MT#11 to #24 transmitted from the mobile terminals MT#11 to #24 at predetermined timings.

The traffic conditions include a traffic volume (such as a packet data volume or packet count) which has actually been transmitted at the mobile terminals MT#11 to #29, a traffic volume which has actually been received at the mobile terminals MT#11 to #24, or a traffic volume stored in a transmission buffer of the mobile terminals MT#11 to #24.

The network management information storage unit 15 is configured to store network management information including location information on mobile terminals acquired by the location information acquiring unit 11, communication condition information acquired by the communication condition information acquiring unit 12, terminal capability information acquired by the terminal capability information acquiring unit 13, and traffic conditions acquired by the traffic condition acquiring unit 14.

The network management information storage unit 15 is configured to manage location information on mobile terminals acquired by the location information acquiring unit 11, traffic conditions acquired by the traffic condition acquiring unit 14, or the like, as traffic distribution in an ad hoc network.

Figure 3A:
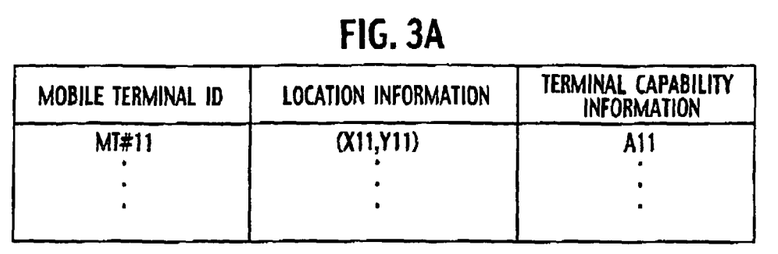
FIGS. 3A to 3C are diagrams showing an example of the contents stored by a network management information storage unit of the assist controller apparatus in the mobile communication system according to the first embodiment of the present invention.
Figure 3B:
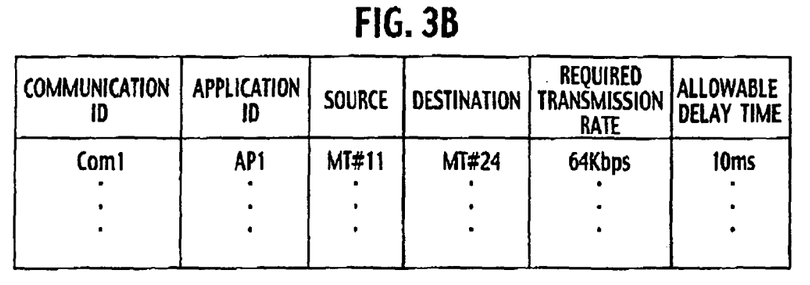
Figure 3C:
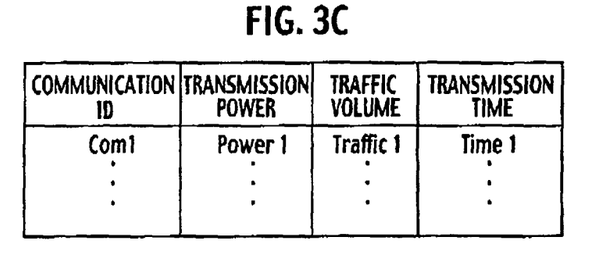

For example, the network management information storage unit 15 is configured to store network management information using tables shown in FIGS. 3A to 3C.

The table shown in FIG. 3A stores a record which associates a "mobile terminal ID", "location information" on a mobile terminal identified by the mobile terminal ID, and "terminal capability information" of the mobile terminal identified by the mobile terminal ID.

In the example of FIG. 3A, the mobile terminal MT#11 is in a coordinate location of (X11,Y11), and has the capability of "terminal capability class All".

The table shown in FIG. 3B stores a record which associates a "communication ID" identifying certain communication, an "application ID" identifying an application used in the communication, a "source" showing a source mobile terminal in the communication, a "destination" showing a destination mobile terminal in the communication, and a "required transmission rate" and an "allowable delay time" set by the application.

The example of FIG. 3B shows that communication of "communication ID=Coin 1" performed between the source mobile terminal MT#11 and the destination mobile terminal MT#24 is being performed using an application of "application ID=AP1" (the required transmission rate is "64 kbps" and the allowable delay time is "10 ms")

The table shown in FIG. 3C stores a table which associates a "communication ID" identifying certain communication, "transmission power" showing transmission power used by a mobile terminal in the communication, a "traffic volume" in the communication, and a "transmission time" in the communication.

In the example of FIG. 3C, the transmission power of the mobile terminal MT#11 performing communication of "communication ID=Com 1" is "Power 1", the traffic volume is "Traffic 1", and the transmission time is "Time 1".

The transmission power determining unit 16 is configured to determine the transmission power of a certain mobile terminal joining in the ad hoc network, based on network management information stored in the network management information storage unit 15.

Specifically, the transmission power determining unit 16 is configured to determine the transmission power of the mobile terminals MT#11 to #24, based on the traffic distribution, the communication condition information, the terminal capability information, or the like in the ad hoc networks.

More specifically, the transmission power determining unit 16 is configured to determine the transmission power of the mobile terminals MT#11 to #24, taking the traffic distribution into account, so that communication conditions required in certain communication are satisfied.

In this case, the transmission power determining unit 16 is configured not to determine transmission power which exceeds the capability of a certain mobile terminal.

Figure 4:
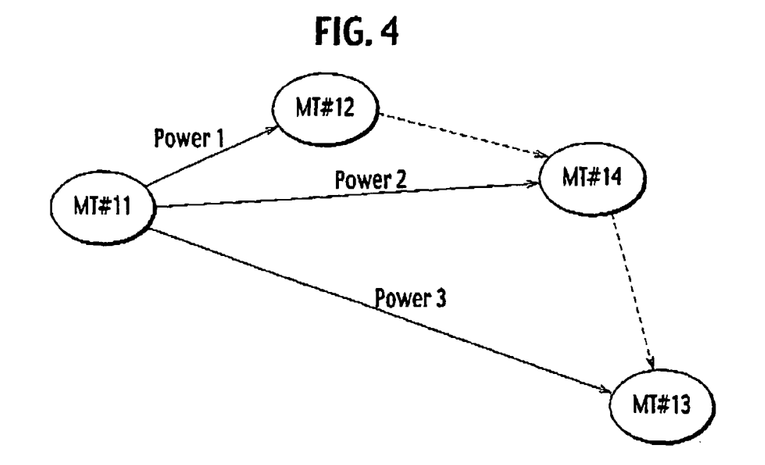
FIG. 4 is a diagram for showing how a transmission power determining unit of the assist controller apparatus in the mobile communication system according to the first embodiment of the present invention determines transmission power.

For example, suppose that, as shown in FIG. 4, the mobile terminal MT#11 can directly communicate with the mobile terminal MT#12 when using transmission power "Power 1", and can directly communicate with the mobile terminal MT#13 when using transmission power "Power 3", and can directly communicate with the mobile terminal MT#14 when using transmission power "Power 2" ("Power 1"<"Power 2"<"Power 3").

In this case, when the mobile terminal MT#11 uses transmission power "Power 1", the number of radio links through which a communication addressed to the mobile terminal MT#13 is routed (hop count) is "3", and when it uses transmission power "Power 2", the number of radio links through which a communication addressed to the mobile terminal MT#13 is routed (hop count) is "2", and when it uses transmission power "Power 3", the number of radio links through which a communication addressed to the mobile terminal MT#13 is routed (hop count) is "1".

As the transmission power increases, the hop count in the communication decreases, but interference with communication of other mobile terminals increases, thus reducing overall throughput in the ad hoc network.

In view of this, the transmission power determining unit 16 is configured to determine transmission power at each mobile terminal, taking overall throughput in an ad hoc network and delay time in communication between mobile terminals into account.

Since the transmission power determining unit 16 is aware of a communication environment in each ad hoc network, it is considered to know whether communication between mobile terminals in certain coordinate locations can be achieved with certain transmission power.

The transmission power determining unit 16 may be configured to determine the transmission power of a certain mobile terminal for each communication destination.

For example, the transmission power determining unit 16 may be configured to decide that the mobile terminal MT#11 use transmission power "Power 1" for a communication addressed to the mobile terminal MT#24, and use transmission power "Power 2" for a communication addressed to the mobile terminal MT#21.

The transmission power determining unit 16 may be configured to determine an antenna gain at a mobile terminal MT equipped with an adaptive antenna array configuration, as the transmission power of the mobile terminal MT.

The transmission power information transmitting unit 17 is configured to transmit transmission power information for specifying transmission power determined by the transmission power determining unit 16 to a certain mobile terminal MT.

The transmission power information transmitting unit 17 may be configured to transmit transmission power information to all the mobile terminals MT#11 to #24 in the ad hoc networks #1 and #2, or may be configured to transmit transmission power information only to part of the mobile terminals whose transmission power is changed.

A mobile terminal MT according to this embodiment is configured to be able to join in the ad hoc networks #1 and #2, and is also configured to be able to connect to the assist controller apparatus 10 in the assist network.

The mobile terminals MT#11 to #24 have basically the same configuration, and hereinafter, the configuration of the mobile terminal MT#11 will be representatively described.

Figure 5:
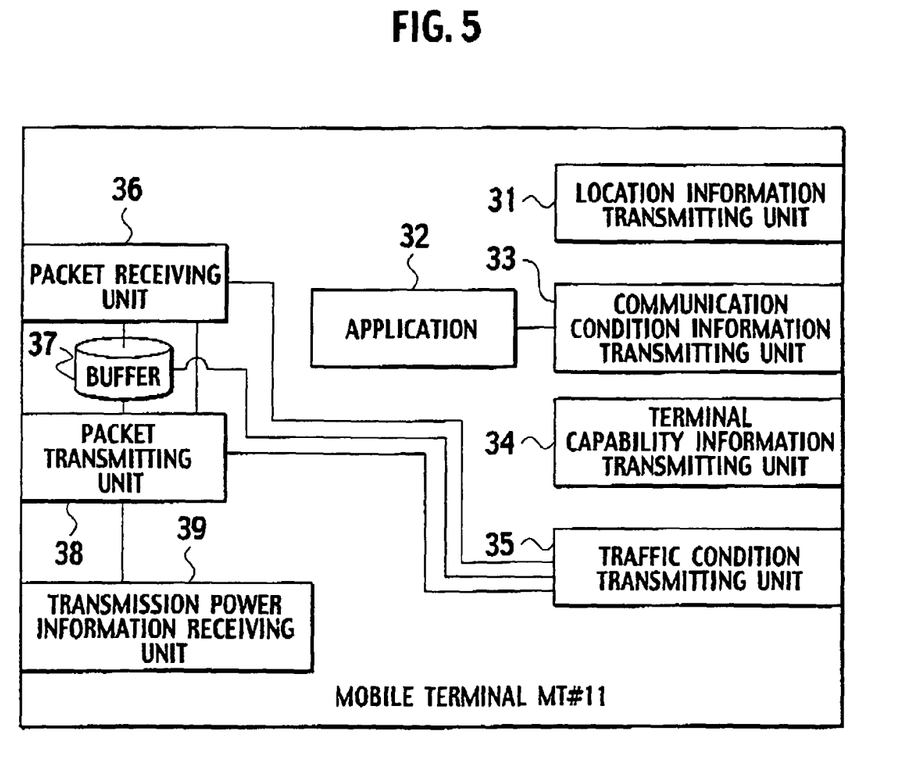
FIG. 5 is a functional block diagram of a mobile terminal in the mobile communication system according to the first embodiment of the present invention.

As shown in FIG. 5, the mobile terminal MT#11 of this embodiment includes a location information transmitting unit 31, an application 32, a communication condition information transmitting unit 33, a terminal capability information transmitting unit 34, a traffic condition transmitting unit 35, a packet receiving unit 36, a buffer 37, a packet transmitting unit 38, and a transmission power information receiving unit 39.

The location information transmitting unit 31 is configured to transmit location information on the mobile terminal MT#11 to the assist controller apparatus 10 at predetermined timings.

For example, when a base station of a connection destination is changed by a handover, or when a movement beyond a predetermined range is detected by GPS information, or when an access point with which a radio link is established is changed, the location information transmitting unit 31 is configured to transmit location information on the mobile terminal MT#11.

The application 32 is an application operated on the mobile terminal MT#11, and is an Internet connection application, for example.

The communication condition information transmitting unit 33 is configured to transmit, to the assist controller apparatus 10, communication condition information including a required transmission rate and an allowable delay time set by the application 32.

The terminal capability information transmitting unit 34 is configured to transmit the above-described terminal capability information to the assist controller apparatus 10 at predetermined timings.

The traffic condition transmitting unit 35 is configured to transmit traffic conditions obtained by monitoring the packet receiving unit 36, the buffer 37 and the packet transmitting unit 38 (such as a transmitted traffic volume, a received traffic volume, a traffic volume waiting to be transmitted, or a congestion state) to the assist controller apparatus 10 at predetermined timings.

The packet receiving unit 36 is configured to receive a packet transmitted from a forwarding source mobile terminal MT, and temporarily stores the received packet in the buffer 37.

The packet transmitting unit 38 is configured to transmit a packet stored in the buffer 37 with transmission power corresponding to transmission power information received by the transmission power information receiving unit 39.

(Operation of the Mobile Communication System in the First Embodiment of the Invention)

Figure 6:
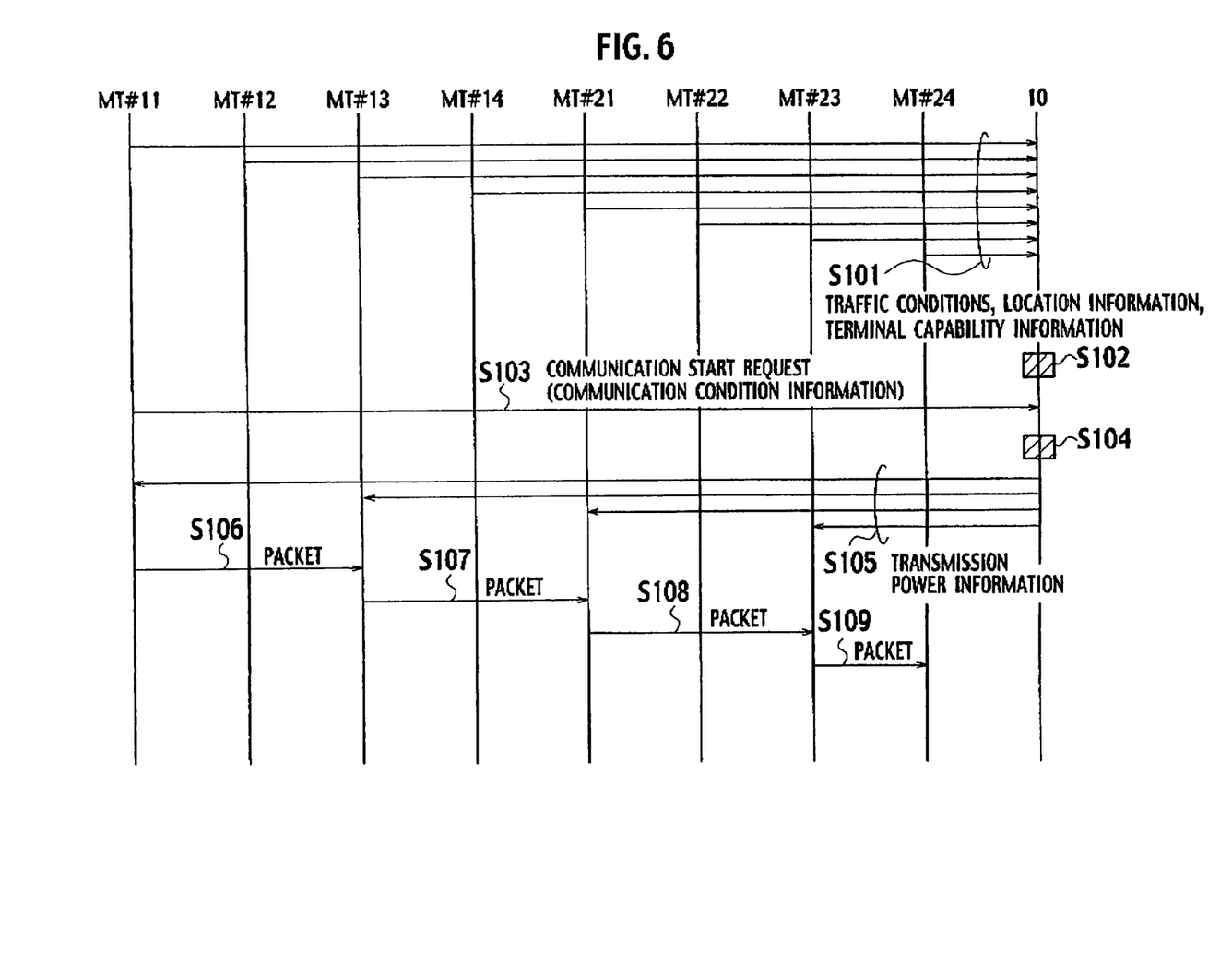
FIG. 6 is a sequence diagram showing an example of operation of the mobile communication system according to the first embodiment of the present invention.

With reference to FIG. 6, the operation of the mobile communication system according to the first embodiment of the present invention will be described.

In step S101, the mobile terminals MT#11 to #24 belonging to the ad hoc networks #1 and #2 transmit location information, traffic conditions and terminal capability information on the mobile terminals MT#11 to #24 to the assist controller apparatus 10.

In step S102, the assist controller apparatus 10 updates network management information, based on the received location information, traffic conditions and terminal capability information on the mobile terminals MT#11 to #24.

In step S103, the mobile terminal MT#11 transmits a start request for communication addressed to the mobile terminal MT#24.

In step S104, the assist controller apparatus 10 determines the transmission power of the mobile terminals MT#11, #13, #21 and #23 in the ad hoc networks #1 and #2, based on communication condition information included in the received communication start request and the stored network management information, taking the overall ad hoc network throughput and an allowable delay time in communication between the mobile terminals MT#11 and #24 into account.

That is, the assist controller apparatus 10 determines a packet transmission route for the communication related to the communication start request, which reaches the destination mobile terminal MT#24 from the source mobile terminal MT#11 through the relay mobile terminals MT#13, #21 and #23.

In step S105, the assist controller apparatus 10 transmits transmission power, information showing the determined transmission power to the mobile terminals MT#11, #13, #21 and #23.

In step S106, the source mobile terminal MT#11 transmits a packet addressed to the destination mobile terminal MT#24 with the transmission power corresponding to the transmission power information received from the assist controller apparatus 10.

In step S107, the relay mobile terminal MT#13 receiving the packet transmitted from the source mobile terminal MT#11 relays the packet addressed to the destination mobile terminal MT#24 with the transmission power corresponding to the transmission power information received from the assist controller apparatus 10.

In step S108, the relay mobile terminal MT#21 receiving the packet relayed by the relay mobile terminal MT#13 relays the packet addressed to the destination mobile terminal MT#24 with the transmission power corresponding to the transmission power information received from the assist controller apparatus 10.

In step S109, the relay mobile terminal MT#23 receiving the packet relayed by the relay mobile terminal MT#21 relays the packet addressed to the destination mobile terminal MT#24 with the transmission power corresponding to the transmission power information received from the assist controller apparatus 10.

As a result, the packet transmitted from the source mobile terminal MT#11 reaches the destination mobile terminal MT#24 with four hops.

(Effects of the Mobile Communication System in the First Embodiment of the Invention)

According to the mobile communication system of this embodiment, based on location information and traffic conditions in the traffic distribution (mobile terminals MT#11 to #24) constantly changing in the ad hoc networks #1 and #2, the transmission power of the certain mobile terminals MT#11 to MT#24 joining in the ad hoc networks #1 and #2 are determined, so that an optimum environment for both overall throughput in the ad hoc networks #1 and #2 and delay time in communication between mobile terminals can be achieved.

According to the mobile communication system of this embodiment, the assist controller apparatus 10 can acquire location information and traffic conditions from the mobile terminals MT#11 to #24 to be aware of the traffic distribution including the location distribution of the mobile terminals MT#11 to #24 or the traffic conditions at the mobile terminals MT#11 to #24 in real time.

According to the mobile communication system of this embodiment, the assist controller apparatus 10 can determine transmission power according to the capabilities of the mobile terminals MT#11 to #24, so that hardware resources, radio bandwidth resources and the like can be effectively used.

According to the mobile communication system of this embodiment, the transmission power of the mobile terminals MT#11 to #24 can be determined, taking the traffic distribution within the ad hoc networks #1 and #2 into account, so that communication conditions required at the mobile terminals MT#11 to #24 are satisfied.

Second Embodiment of the Invention

Figure 7:
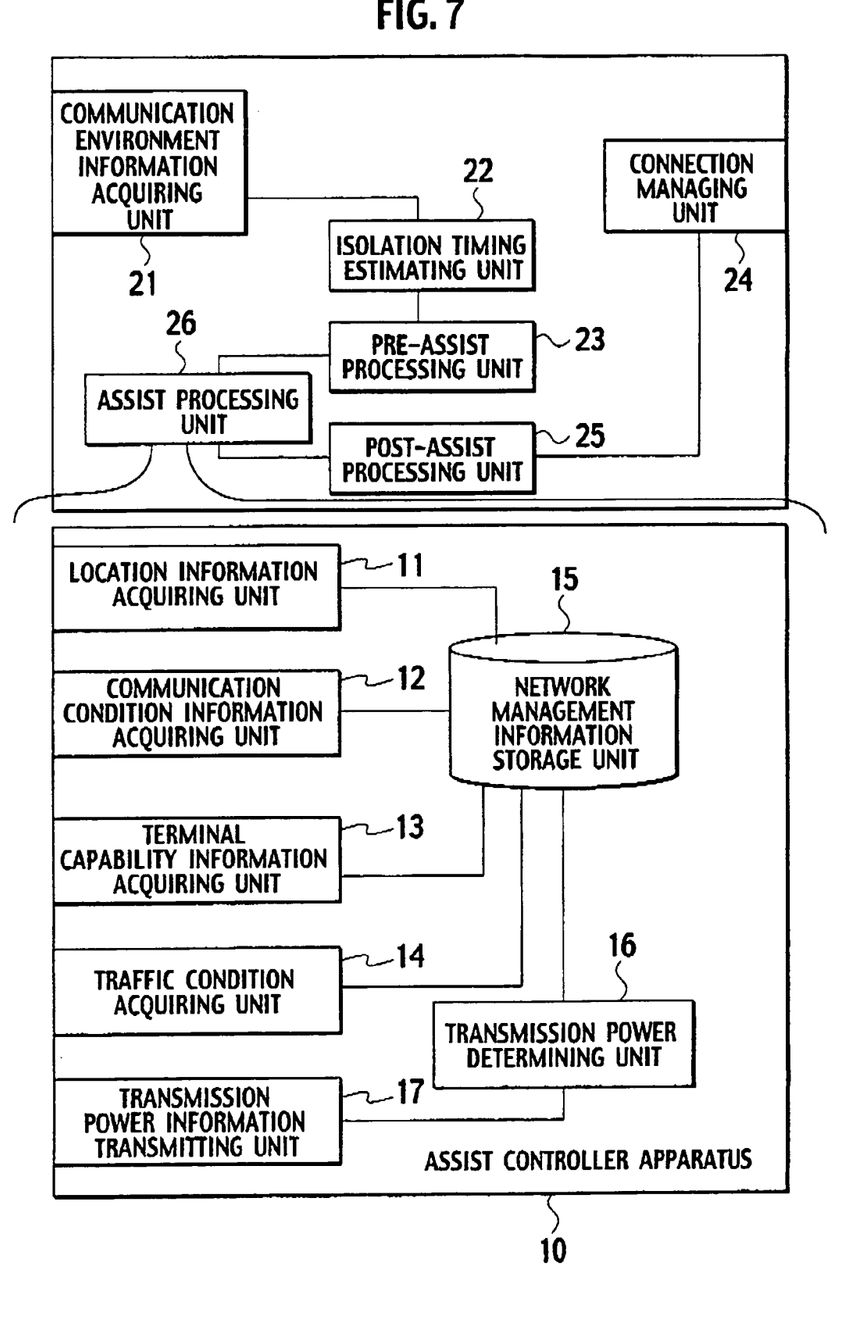
FIG. 7 is a functional block diagram of an assist controller apparatus in the mobile communication system according to the second embodiment of the present invention.
Figure 8:
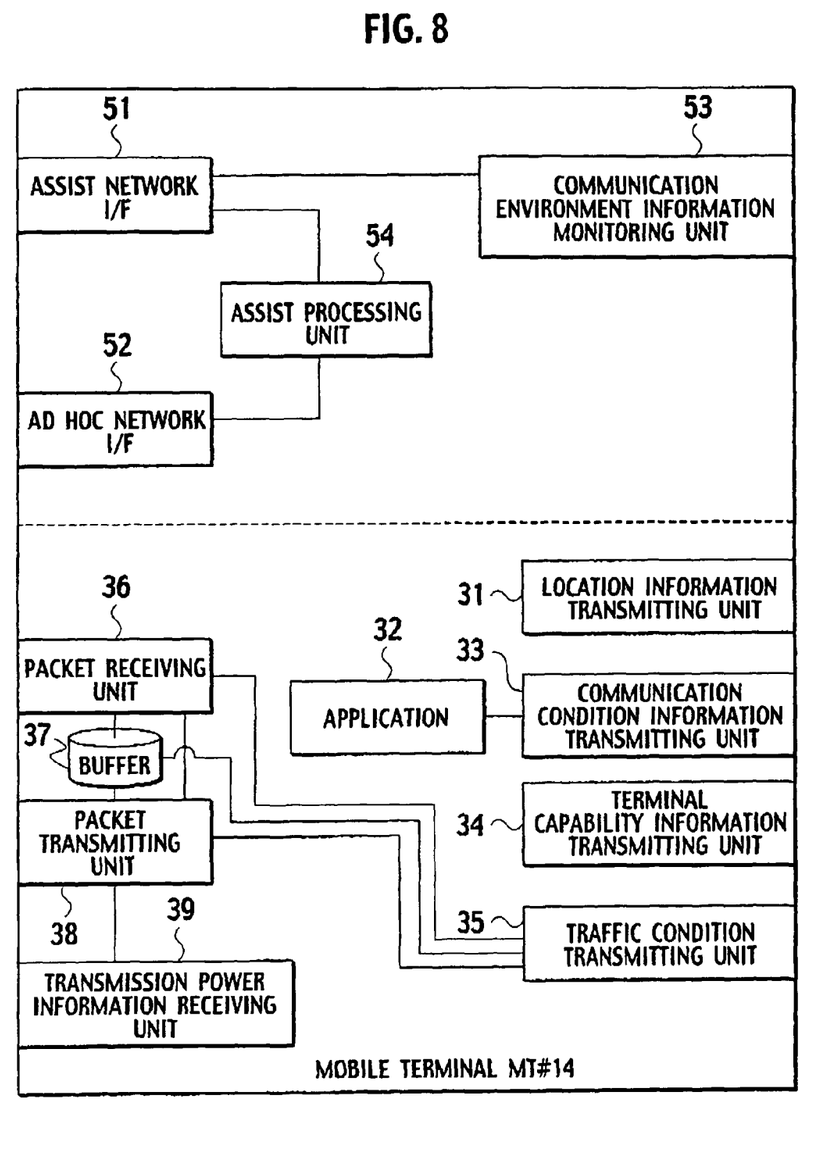
FIG. 8 is a functional block diagram of a mobile terminal in the mobile communication system according to the second embodiment of the present invention.
Figure 9:
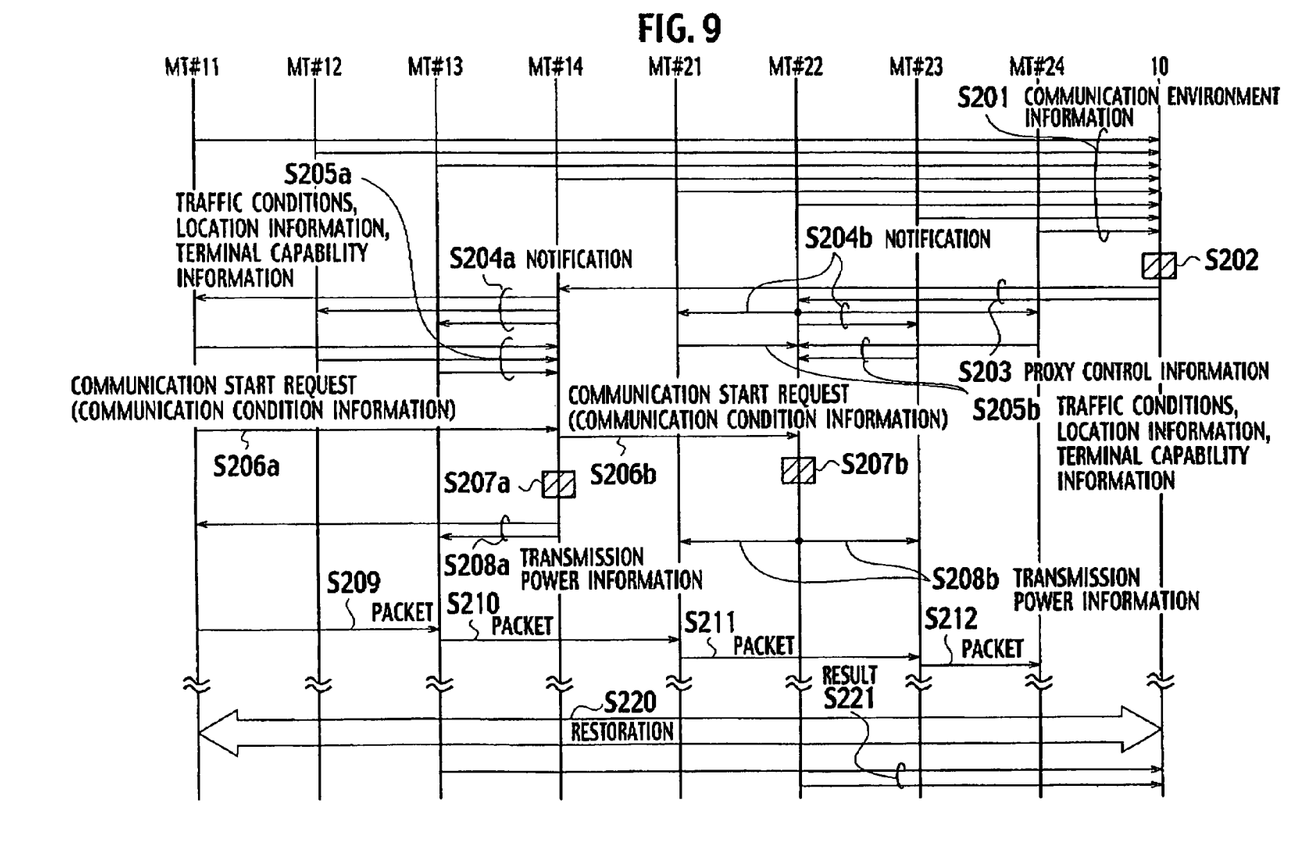
FIG. 9 is a sequence diagram showing an example of operation of the mobile communication system according to the second embodiment of the present invention.

With reference to FIGS. 7 to 9, a mobile communication system according to a second embodiment of the present invention will be described.

Hereinafter, differences of the mobile communication system in the second embodiment of the present invention from the mobile communication system of the above-described first embodiment will be mainly described.

In this embodiment, the configuration of a representative mobile terminal MT (e.g., mobile terminal #14), among mobile terminals MT#11 to #14 belonging to an ad hoc network #1, which can perform communication control in the ad hoc network #1 in place of an assist controller apparatus 10, in a situation where connections between the mobile terminals MT#11 to #14 and the assist network 10 are cut, will be described.

As shown in FIG. 7, the assist controller apparatus 10 according to this embodiment includes a communication environment information acquiring unit 21, an isolation timing estimating unit 22, a pre-assist processing unit 23, a connection managing unit 24, a post-assist processing unit 25, and an assist processing unit 26.

The communication environment information acquiring unit 21 is configured to acquire, from the mobile terminals MT#11 to MT#24 belonging to the ad hoc networks #1 and #2, communication environment information showing communication environments at the mobile terminals MT#11 to MT#24.

The communication environment information acquiring unit 21 is configured to acquire radio wave conditions at the mobile terminals MT#11 to #24 as communication environment information.

The radio wave conditions may be reception power, reception SIR or reception CIF at the mobile terminals MT#11 to MT#24.

The communication environment information acquiring unit 21 may be configured to acquire information other than radio wave conditions as communication environment information if the information shows communication environments at the mobile terminals MT#11 to MT#24.

The communication environment information acquiring unit 21 may be configured to wait transmission of communication environment information from the mobile terminals MT#11 to MT#24 for acquisition.

The communication environment information acquiring unit, 21 may be configured to transmit a communication environment information acquisition request to the mobile terminals MT#11 to MT#24 at predetermined timings, so as to acquire communication environment information.

The isolation timing estimating unit 22 is configured to determine whether acquired communication environment information satisfies a predetermined condition or not.

Specifically, when acquired communication environment information satisfies the predetermined condition, the isolation timing estimating unit 22 is configured to estimate that the connections between the assist controller apparatus 10 and the mobile terminals MT#11 to #14 will be cut soon (that is, the ad hoc network #1 formed by the mobile terminals MT#11 to MT#14 will be isolated soon).

For example, when the average of the reception power, the reception SIR or the reception CIR at the mobile terminals MT#11 to MT#19 is less than or equal to a predetermined threshold, the isolation timing estimating unit 22 is configured to determine that acquired communication environment information satisfies the predetermined condition.

Alternatively, the isolation timing estimating unit 22 may be configured to prepare several predetermined conditions, and to estimate the timing of isolation of the ad hoc networks #1 and #2 formed by the mobile terminals MT#11 to MT#24 based on a predetermined condition which acquired communication environment information satisfies.

For example, when the average of the reception power, the reception SIR or the reception CIR at the mobile terminals MT#11 to MT#24 is less than or equal to a first threshold, the isolation timing estimating unit 22 is configured to estimate that the connections between the assist controller apparatus 10 and the mobile terminals MT#11 to #24 will be cut in ten seconds (that is, the isolation timing is in ten seconds).

When the average of the reception power, the reception SIR or the reception CIR at the mobile terminals MT#11 to #29 is less than or equal to a second threshold (first threshold>second threshold), the isolation timing estimating unit 22 is configured to estimate that the connections between the assist controller apparatus 10 and the mobile terminals MT#11 to MT#24 will be cut in one second (that is, the isolation timing is in one second).

The pre-assist processing unit 23 is configured to instruct a representative mobile terminal (e.g., mobile terminal MT#14) belonging to the ad hoc network #1 to perform communication control in the ad hoc network #1 in place of the assist processing unit 26 of the assist controller apparatus 10, based on a result of determination by the isolation timing estimating unit 22.

Specifically, the pre-assist processing unit 23 is configured to transmit proxy control information for performing communication control in the ad hoc network #1 in place of the assist processing unit 26 of the assist controller apparatus 10, to the representative mobile terminal MT#14 belonging to the ad hoc network #1.

The proxy control information includes, for example, an estimation that the connections between the assist controller apparatus 10 and the mobile terminals MT#11 to MT#14 will be cut soon (that is, the ad hoc network #1 formed by the mobile terminals MT#11 to #14 will be isolated soon), an isolation timing, and a program and data (such as network management information) required for performing communication control in the ad hoc network #1.

The pre-assist processing unit 23 may be configured to control the timing of transmission of the proxy control information, based on the isolation timing estimated by the isolation timing estimating unit 22.

The pre-assist processing unit 23 may be alternatively configured to transmit the proxy control information to a plurality of representative mobile terminals instead of transmitting the proxy control information to the one representative mobile terminal MT#14, thereby instructing them to perform communication control in the ad hoc network #1 in place of the assist processing unit 26 of the assist controller apparatus 10.

The connection managing unit 24 is configured to manage the connections between the mobile terminals MT#11 to MT#24 forming the ad hoc networks #1 and #2 and the assist controller apparatus 10.

When the connection managing unit 24 detects restoration of the connections, it is configured to communicate that to the post-assist processing unit 25.

The post-assist processing unit 25 is configured to perform post-processing on communication control which the representative mobile terminal MT#14 has performed in place of the assist processing unit 26 of the assist controller apparatus 10, when the connections between the mobile terminals MT#11 to MT#24 belonging to the ad hoc networks #1 and #2 and the assist controller apparatus 10 are restored.

Specifically, the post-assist processing unit 25 is configured to receive a result of communication control (such as update information on the network management information) performed by the representative mobile terminal MT#14 in place of the assist processing unit 26 of the assist controller apparatus 10 when the connections between the mobile terminals MT#11 to MT#24 belonging to the ad hoc networks #1 and #2 and the assist controller apparatus 10 are restored.

Then, the post-assist processing unit 25 performs processing, based on the received communication control result, for the assist processing unit 26 to resume communication control in the ad hoc networks #1 and #2.

The assist processing unit 26 is configured to perform communication control in the ad hoc networks #1 and #2.

That is, the assist processing unit 26 is configured to implement the functions of a location information acquiring unit 11, a communication condition information acquiring unit 12, a terminal capability information acquiring unit 13, a traffic condition acquiring unit 14, a network management information storage unit 15, a transmission power determining unit 16, and a transmission power information transmitting unit 17 (see FIG. 2).

As shown in FIG. 8, the mobile terminal MT#14 of this embodiment includes, in addition to the components shown in FIG. 5, an assist network interface (I/F) 51, an ad hoc network interface (I/F) 52, a communication environment information monitoring unit 53, and an assist processing unit 54.

The assist network interface 51 is configured to serve as an interface with an assist network.

For example, the assist network interface 51 is configured to transmit, to the assist controller apparatus 10, at predetermined timings, communication environment information showing a communication environment at the mobile terminal MT#14 generated by the communication environment information monitoring unit 53.

The assist network interface 51 is also configured to receive proxy control information from the assist controller apparatus 10, and to forward the received proxy control information to the assist processing unit 54.

The assist network interface 51 is also configured to manage the connection between the mobile terminal MT#14 and the assist controller apparatus 10, and when the connection is cut or when it determines that the connection will be cut soon, to communicate that to the assist processing unit 54.

The ad hoc network interface 52 is configured to serve as an interface with an ad hoc network.

The ad hoc network interface 52 is configured to perform direct communication with the other mobile terminals MT#11 to #24 belonging to the ad hoc networks #1 and #2, thereby transmitting and receiving certain information.

During a period in which the assist processing unit 54 performs communication control in the ad hoc network #1 in place of the assist processing unit 26 of the assist controller apparatus 10, for example, the ad hoc network interface 52 is configured to acquire information fundamental to the network management information such as location information, traffic conditions, communication condition information and terminal capability information from the other mobile terminals MT#11 to #13 belonging to the ad hoc network #1, and to transmit transmission power information showing determined transmission power of the mobile terminals MT#11 to #13.

The communication environment information monitoring unit 53 is configured to monitor a communication environment at the mobile terminal MT#14, so as to generate communication environment information.

For example, the communication environment information monitoring unit 53 is configured to generate communication environment information showing radio wave conditions at the mobile terminal MT#14 (such as the reception power, the reception SIR or the reception CIR at the mobile terminal MT#14).

The communication environment information monitoring unit 53 may be alternatively configured to generate communication environment information including information other than radio wave conditions if the information shows a communication environment at the mobile terminal MT#14.

The assist processing unit 54 is configured to perform communication control for the other mobile terminals MT#11 to #13 belonging to the ad hoc network #1, in place of the assist processing unit 26 of the assist controller apparatus 10, based on proxy control information received through the assist network interface 51, when the connection between the mobile terminal MT#14 and the assist controller apparatus 10 is cut, at the latest.

That is, in that case, the assist processing unit 54 is configured to implement the functions of the location information acquiring unit 11, the communication condition information acquiring unit 12, the terminal capability information acquiring unit 13, the traffic condition acquiring unit 14, the network management information storage unit 15, the transmission power determining unit 16, and the transmission power information transmitting unit 17 (see FIG. 2).

The assist processing unit 54 only needs to be configured to perform the above-described communication control when the connection is cut, at the latest, and may be configured to perform the communication control after a lapse of a predetermined period since reception of the proxy control information.

Also, when the connection between the mobile terminal MT#14 and the assist controller apparatus 10 is restored, the assist processing unit 54 is configured to transmit a result of the communication control it has performed in place of the assist processing unit 26 of the assist controller apparatus 10 (such as network management information) to the assist controller apparatus 10 through the assist network interface 51.

With reference to FIG. 9, an example of operation in the mobile communication system according to this embodiment will be described, in which communication in the ad hoc network #1 is changed from the state of being controlled by the assist controller apparatus 10 to the state of being autonomously controlled by the representative mobile terminal MT#14, and also communication in the ad hoc network #2 is changed from the state of being controlled by the assist controller apparatus 10 to the state of being autonomously controlled by the representative mobile terminal MT#22.

As shown in FIG. 9, in step S201, the connections between the assist controller apparatus 10 and the mobile terminals MT#11, #12, #13, #14, #21, #22, #23 and #24 are established.

The mobile terminals MT#11, #12, #13, #14, #21, #22, #23 and #24 transmit communication environment information to the assist controller apparatus 10 at a predetermined timing.

In step S202, since the communication environment information satisfies a predetermined condition, the isolation timing estimating unit 22 of the assist controller apparatus 10 estimates that the connections between the assist controller apparatus 10 and the mobile terminals MT#11, #12, #13 and #14 forming the ad hoc network #1 will be cut soon (that is, the ad hoc network #1 formed by the mobile terminals MT #11, #12, #13 and #14 will be isolated soon), and the connections between the assist controller apparatus 10 and the mobile terminals MT#21, #22, #23 and #24 forming the ad hoc network #2 will be cut soon (that is, the ad hoc network #2 formed by the mobile terminals MT #21, #22, #23 and #24 will be isolated soon).

In step S203, the pre-assist processing unit 23 of the assist controller apparatus 10 transmits proxy control information (including network management information) to the representative mobile terminal MT#14 in the ad hoc network #1 and the representative mobile terminal MT#22 in the ad hoc network #2.

In step S204a, the representative mobile terminal MT#14 notifies the mobile terminals MT#11, #12 and #13 in the ad hoc network #1 that it performs communication control in the ad hoc network #1 in place of the assist controller apparatus 10, based on the received proxy control information.

In step S204b, the representative mobile terminal MT#22 notifies the mobile terminals MT#21, #23 and #24 in the ad hoc network #2 that it performs communication control in the ad hoc network #2 in place of the assist controller apparatus 10, based on the received proxy control information.

In step S205a, the mobile terminals MT#11, #12 and #13 report location information, traffic conditions and terminal capability information on the mobile terminals MT#11, #12 and #13 to the representative mobile terminal MT#14.

In step S205b, the mobile terminals MT#21, #23 and #24 report location information, traffic conditions and terminal capability information on the mobile terminals MT#21, #23 and #24 to the representative mobile terminal MT#22.

In step S206a, the mobile terminal MT#11 transmits a start request for communication addressed to the mobile terminal MT#24 (including communication condition information) to the representative mobile terminal MT#14.

In step S206b, the representative mobile terminal MT#14 transmits the communication start request received from the mobile terminal MT#11 to the representative mobile terminal MT#22 in the ad hoc network #2.

In step S207a, the representative mobile terminal MT#14 determines the transmission power of the mobile terminals MT#11 and #13 in the ad hoc network #1, based on the communication condition information included in the received communication start request and the stored network management information, taking overall throughput in the ad hoc network #1 and an allowable delay time in communication between the mobile terminals MT#11 and #24 into account.

That is, the representative mobile terminal MT#14 determines a packet transmission route in the ad hoc network #1 for communication related to the communication start request, which is a transmission route from the source mobile terminal MT#11 through the relay mobile terminal MT#13 to the ad hoc network #2.

On the other hand, in step S207b, the representative mobile terminal MT#22 determines the transmission power of the mobile terminals MT#21 and #23 in the ad hoc network #2, based on the communication condition information included in the received communication start request and the stored network management information, taking overall throughput in the ad hoc network #2 and the allowable delay time in communication between the mobile terminals MT#11 and #29 into account.

That is, the representative mobile terminal MT#22 determines a packet transmission route in the ad hoc network #2 for communication related to the communication start request, which is a route reaching the destination mobile terminal MT#24 from the relay mobile terminal MT#21 through the relay mobile terminal MT#23.

In step S208a, the representative mobile terminal MT#14 transmits transmission power information showing the determined transmission power to the mobile terminals MT#11 and #13.

Also, in step S208b, the representative mobile terminal MT#22 transmits transmission power information showing the determined transmission power to the mobile terminals. MT#21 and #23.

In step S209, the source mobile terminal MT#11 transmits a packet addressed to the destination mobile terminal MT#24 with the transmission power corresponding to the transmission power information received form the representative mobile terminal MT#14.

In step S210, the relay mobile terminal MT#13 receiving the packet transmitted from the source mobile terminal MT#11 relays the packet addressed to the destination mobile terminal MT#24 with the transmission power corresponding to the transmission power information received from the representative mobile terminal MT#14.

In step S211, the relay mobile terminal MT#21 receiving the packet relayed by the relay mobile terminal MT#13 relays the packet addressed to the destination mobile terminal MT#24 with the transmission power corresponding to the transmission power information received from the representative mobile terminal MT#22.

In step S212, the relay mobile terminal MT#23 receiving the packet relayed by the relay mobile terminal MT#21 relays the packet addressed to the destination mobile terminal MT#24 with the transmission power corresponding to the transmission power information received from the representative mobile terminal MT#22.

As a result, the packet transmitted from the source mobile terminal MT#11 reaches the destination mobile terminal MT#24 with four hops.

In step S220, when the connections between the mobile terminals MT#11, #12, #13 and #14 and the assist controller apparatus 10, and the connections between the mobile terminals MT#21, #22, #23 and #24 and the assist controller apparatus 10 are restored, in step S221, the representative mobile terminal MT#14 and the representative mobile terminal MT#22 detect that, and transmit results of communication control they have performed in place of the assist controller apparatus 10 (e.g., update information on the network management information) to the assist controller apparatus 10.

Then, the post-assist processing unit 25 of the assist controller apparatus 10 inherits the control state (such as changed network management information) during a period of disconnection between the mobile terminals MT #11, #12, #13 and #14 and the assist controller apparatus 10 and disconnection between the mobile terminals MT#21, #22, #23 and #24 and the assist controller apparatus 10, based on the received communication control results, and then, the assist processing unit 26 of the assist controller apparatus 10 resumes communication control in the ad hoc networks #1 and #2.

According to the mobile communication system of the second embodiment of the present invention, even when the predetermined condition is satisfied (e.g., when radio wave conditions between the assist controller apparatus 10 and the mobile terminals MT#11, #12, #13 and #14 and radio wave conditions between the assist controller apparatus 10 and the mobile terminals MT#21, #22, #23 and #24 deteriorate), the pre-assist processing unit 23 of the assist controller apparatus 10 transmits proxy control information (network management information) to the representative mobile terminal MT#14 and the representative mobile terminal MT#22, whereby the representative mobile terminal MT#14 and the representative mobile terminal MT#22 can perform communication control in the ad hoc networks #1 and #2 in place of the assist controller apparatus 10, using the proxy control information transmitted from the assist controller apparatus 10.

According to the mobile communication system of the second embodiment of the present invention, the assist controller apparatus 10 can quickly and easily resume communication control in the ad hoc networks #1 and #2, using results of communication control (such as changed network management information) by the representative mobile terminal MT#14 and the representative mobile terminal MT#22.

Therefore, according to the mobile communication system of the second embodiment of the present invention, even when communication between the assist controller apparatus 10 and the ad hoc network #1 and communication between the assist controller apparatus 10 and the ad hoc network #2 are disconnected and the ad hoc networks #1 and #2 are isolated, the representative mobile terminal MT#14 and the representative mobile terminal MT#22 perform the functions of the assist controller apparatus 10, so that communication control in the ad hoc networks #1 and #2 can be performed without interruption.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A controller apparatus configured to control an ad hoc network formed by a plurality of mobile terminals, and provided in an assist network separate from the ad hoc network, the controller apparatus comprising:
   a storage unit configured to store traffic distribution information indicating a traffic distribution in the ad hoc network which is a correspondence between traffic volume of respective mobile terminals and locations of the respective mobile terminals, the traffic volume being any one of a volume of packets actually transmitted, a volume of packets actually received and a volume of packets stored in a transmission buffer of each of the respective mobile terminals; and
   a transmission power determining unit configured to determine transmission power of a mobile terminal joining in the ad hoc network, based on the stored traffic distribution information,
   wherein the controller apparatus receives the traffic volume and the locations from the respective mobile terminals via the assist network, and
   the controller apparatus transmits the determined transmission power to the mobile terminal joining in the ad hoc network via the assist network.

2. The controller apparatus according to claim 1, further comprising:
   a terminal capability information acquiring unit configured to acquire terminal capability information showing capabilities of the respective mobile terminals;
   wherein the transmission power determining unit is configured to determine the transmission power of the mobile terminal joining in the ad hoc network, based on the stored traffic distribution information and the terminal capability information.

3. The controller apparatus according to claim 1, further comprising:
   a communication condition information acquiring unit configured to acquire communication condition information required for the respective mobile terminals;
   wherein the transmission power determining unit is configured to determine the transmission power of the mobile terminal joining in the ad hoc network, based on the stored traffic distribution information and the communication condition information.

4. The controller apparatus according to claim 3, wherein the communication condition information is configured to include an allowable delay time and a required transmission rate set by an application operated on the mobile terminals.

5. The controller apparatus according to claim 1, further comprising:
   a communication environment information acquiring unit configured to acquire communication environment information showing a communication environment at each of the respective mobile terminals; and
   a proxy control information transmitting unit configured to transmit proxy control information for controlling the ad hoc network in place of the controller apparatus, to a representative mobile terminal which is one of the plurality of mobile terminals forming the ad hoc network, when the acquired communication environment information satisfies a predetermined condition.

6. The controller apparatus according to claim 1, further comprising:
   a network management information unit configured to store a communication ID, a transmission power, and a transmission duration time for respective mobile terminals,
   wherein the transmission power determining unit determines the transmission power of the mobile terminal joining the ad hoc network based on the traffic distribution information, the stored communication ID, the stored transmission power, and the stored transmission duration time.

7. A mobile terminal configured to join an ad hoc network, formed by a plurality of mobile terminals, comprising:
   a transmitting unit configured to transmit, to a controller apparatus controlling the ad hoc network and provided in an assist network separate from the ad hoc network, traffic volume of the mobile terminal and a location of the mobile terminal via the assist network, the traffic volume being any one of a volume of packets actually transmitted, a volume of packets actually received or a volume of packets stored in a transmission buffer of the mobile terminal; and
   a communicating unit configured to perform communication in the ad hoc network with transmission power received from the controller apparatus via the assist network, the transmission power being determined by the controller apparatus being based on traffic distribution information stored in the controller apparatus, the stored traffic distribution information indicating a traffic distribution in the ad hoc network which is a correspondence between the traffic volume of respective mobile terminals and the locations of the respective mobile terminals.

8. A communication control method for controlling an ad hoc network formed by a plurality of mobile terminals connectable to a controller apparatus located in an assist network separate from the ad hoc network, the method comprising:

transmitting, from respective mobile terminals via the assist network to the controller apparatus, locations of the respective mobile terminals and a traffic volume of the respective mobile terminals, the traffic volume being any one of a volume of packets actually transmitted, a volume of packets actually received or a volume of packets stored in a transmission buffer of each of the respective mobile terminals;

storing, at the controller apparatus, traffic distribution information indicating a traffic distribution in the ad hoc network which is a correspondence between the traffic volume of the respective mobile terminals and the location of the respective mobile terminals;

determining, at the controller apparatus, transmission power of a mobile terminal joining in the ad hoc network, based on the stored traffic distribution information; and performing, at the mobile terminal joining in the ad hoc network, communication in the ad hoc network with the determined transmission power received via the assist network.

9. The communication control method according to claim 8, further comprising:

transmitting, from respective mobile terminals to the controller apparatus via the assist network, a transmission duration time of the respective mobile terminals;

determining, at the controller apparatus, the transmission power of the mobile terminal joining the ad hoc network, based on the stored traffic distribution information and the received transmission time duration.

10. A representative mobile terminal which is one of a plurality of mobile terminals forming an ad hoc network and controls the ad hoc network, the representative mobile terminal comprising:

a storage unit configured to store traffic distribution information indicating a traffic distribution in the ad hoc network which is a correspondence between traffic volume of respective mobile terminals and location of the respective mobile terminals, the traffic volume being any one of a volume of packets actually transmitted, a volume of packets actually received and a volume of packets stored in a transmission buffer of respective mobile terminals; and a transmission power determining unit configured to determine transmission power of a mobile terminal joining the ad hoc network, based on the stored traffic distribution information.

11. A communication control method for controlling an ad hoc network formed by a plurality of mobile terminals, the ad hoc network being controlled by a representative mobile terminal which is one of the plurality of mobile terminals, the method comprising:

transmitting, from respective mobile terminals to the representative mobile terminal, locations of the respective mobile terminals and traffic volume of the respective mobile terminals, the traffic volume being any one of a volume of packets actually transmitted, a volume of packets actually received or a volume of packets stored in a transmission buffer of each of the respective mobile terminals;

storing, at the representative mobile terminal, traffic distribution information indicating a traffic distribution in the ad hoc network which is a correspondence between the traffic volume of the respective mobile terminals and the locations of the respective mobile terminals;

determining, at the representative mobile terminal, transmission power of a mobile terminal joining in the ad hoc network, based on the stored traffic distribution information; and performing, at the mobile terminal joining in the ad hoc network, communication in the ad hoc network with the determined transmission power.

\* \* \* \* \*